US010083710B2

United States Patent
Chiou et al.

(10) Patent No.: US 10,083,710 B2
(45) Date of Patent: Sep. 25, 2018

(54) VOICE CONTROL SYSTEM, VOICE CONTROL METHOD, AND COMPUTER READABLE MEDIUM

(71) Applicant: BXB Electronics Co., Ltd., Kaohsiung (TW)

(72) Inventors: Kai-Sheng Chiou, Kaohsiung (TW); Chih-Lin Hung, Kaohsiung (TW); Chung-Nan Lee, Kaohsiung (TW); Chao-Wen Wu, Kaohsiung (TW)

(73) Assignee: BXB Electronics Co., Ltd., Kaohsiung (TW)

( * ) Notice: Subject to any disclaimer, the term of this patent is extended or adjusted under 35 U.S.C. 154(b) by 23 days.

(21) Appl. No.: 15/156,378

(22) Filed: May 17, 2016

(65) Prior Publication Data
US 2016/0343389 A1 Nov. 24, 2016

(30) Foreign Application Priority Data

May 19, 2015 (TW) .............................. 104115893 A
May 13, 2016 (TW) .............................. 105114914 A

(51) Int. Cl.
*G10L 25/57* (2013.01)
*G06K 9/00* (2006.01)
*G10L 15/25* (2013.01)

(52) U.S. Cl.
CPC .......... *G10L 25/57* (2013.01); *G06K 9/00248* (2013.01); *G10L 15/25* (2013.01)

(58) Field of Classification Search
CPC ........... G06T 2207/10016; G06T 2207/30201; H04M 3/5315; H04M 3/567;
(Continued)

(56) References Cited

U.S. PATENT DOCUMENTS 4,052,568 A * 10/1977 Jankowski .............. G10L 25/78
704/233
4,625,327 A * 11/1986 Sluijter ................... G10L 25/93
704/214
(Continued)

FOREIGN PATENT DOCUMENTS

CN         102214291 A   * 10/2011
CN         CN202551276 U   11/2012

OTHER PUBLICATIONS

Translated Version of CN102214291.*
(Continued)

*Primary Examiner* — Carol Wang
(74) *Attorney, Agent, or Firm* — Alan D. Kamrath; Kamrath IP Lawfirm, P.A.

(57) ABSTRACT

A voice control system including a voice receiving unit, an image capturing unit, a storage unit and a control unit is disclosed. The voice receiving unit receives a voice. The image capturing unit captures a video image stream including several human face images. The storage unit stores the voice and the video image stream. The control unit is electrically connected to the voice receiving unit, the image capturing unit and the storage unit. The control unit detects a feature of a human face from the human face images, defines a mouth motion detection region from the feature of the human face, and generates a control signal according to a variation of the mouth motion detection region and a variation of the voice over time. A voice control method, a computer program product and a computer readable medium are also disclosed.

26 Claims, 6 Drawing Sheets

(58) Field of Classification Search
CPC ......... H04N 21/44008; H04N 21/4394; H04N 21/2368; H04N 21/4307; H04N 7/15; G10L 25/57; G10L 15/25; G06K 9/00248
See application file for complete search history.

(56) References Cited

U.S. PATENT DOCUMENTS

| | | | | |
|---|---|---|---|---|
| 5,907,351 | A * | 5/1999 | Chen | H04N 7/142 |
| | | | | 345/473 |
| 6,369,846 | B1 * | 4/2002 | Katsumi | H04N 7/152 |
| | | | | 348/14.01 |
| 6,526,161 | B1 * | 2/2003 | Yan | G06K 9/00281 |
| | | | | 348/E13.014 |
| 8,903,130 | B1 * | 12/2014 | Carceroni | G06K 9/00765 |
| | | | | 382/103 |
| 8,913,103 | B1 * | 12/2014 | Sargin | G06K 9/00221 |
| | | | | 348/14.12 |
| 9,263,044 | B1 * | 2/2016 | Cassidy | G06K 9/00 |
| 2004/0267521 | A1 * | 12/2004 | Cutler | G10L 15/25 |
| | | | | 704/202 |
| 2005/0228673 | A1 * | 10/2005 | Nefian | G10L 15/25 |
| | | | | 704/270 |
| 2006/0074663 | A1 * | 4/2006 | Shao | G10L 15/04 |
| | | | | 704/254 |
| 2009/0139536 | A1 * | 6/2009 | Yano | A45D 44/005 |
| | | | | 132/200 |
| 2010/0250246 | A1 * | 9/2010 | Matsumoto | G10L 25/93 |
| | | | | 704/208 |
| 2011/0093273 | A1 * | 4/2011 | Lee | G10L 15/24 |
| | | | | 704/270 |
| 2011/0164105 | A1 * | 7/2011 | Lee | H04N 7/142 |
| | | | | 348/14.02 |
| 2011/0257971 | A1 * | 10/2011 | Morrison | G06K 9/00221 |
| | | | | 704/233 |
| 2011/0317872 | A1 * | 12/2011 | Free | G06K 9/00228 |
| | | | | 382/103 |
| 2014/0028826 | A1 * | 1/2014 | Lee | G10L 15/25 |
| | | | | 348/77 |
| 2014/0379351 | A1 * | 12/2014 | Raniwala | G06K 9/00335 |
| | | | | 704/270 |
| 2015/0036856 | A1 * | 2/2015 | Pruthi | G06F 3/04842 |
| | | | | 381/317 |
| 2015/0279364 | A1 * | 10/2015 | Krishnan | G10L 15/25 |
| | | | | 704/251 |
| 2015/0331490 | A1 * | 11/2015 | Yamada | G06F 3/017 |
| | | | | 345/156 |

OTHER PUBLICATIONS

Chen, Shi-Huang, and Jhing-Fa Wang. "A wavelet-based voice activity detection algorithm in noisy environments." In Electronics, Circuits and Systems, 2002. 9th International Conference on, vol. 3, pp. 995-998. IEEE, 2002.*
Berthold K.P. Horn and Brian G. Schunck, Determining Optical Flow, Artificial Intelligence 17 (1981), pp. 185-203, North-Holland.
Gunnar Farneback, Two-Frame Motion Estimation Based on Polynomial Expansion, Computer Vision Laboratory—Linkoping University, Sweden paper, 2003, pp. 363-370, vol. 2749, Springer Berlin/Heidelberg.
Jean-Yves Bouguet, Pyramidal Implementation of the Lucas Kanade Feature Tracker Description of the algorithm, 9 pages, Intel Corporation Microprocessor Research Labs, Jan. 2000.
Michael Tao et al., SimpleFlow: A Non-iterative Sublinear Optical Flow Algorithm, Eurographics, 2012, 9 pages, vol. 31 No. 2, Blackwell Publishing, Oxford, U.K. and Malden, MA, USA.

* cited by examiner

VOICE CONTROL SYSTEM, VOICE CONTROL METHOD, AND COMPUTER READABLE MEDIUM

CROSS REFERENCE TO RELATED APPLICATIONS

The application claims the benefit of Taiwan application serial Nos. 104115893 and 105114914, respectively filed on May 19, 2015 and May 13, 2016, and the subject matter of which is incorporated herein by reference.

BACKGROUND OF THE INVENTION

1. Field of the Invention

The present disclosure generally relates to an electronic control system, a computer program product and a computer readable medium and, more particularly, to a voice control system, a voice control method, a computer program product and a computer readable medium.

2. Description of the Related Art

Due to the booming electronic communication technology, electronic communication systems such as video conferencing systems, contribution systems, public address systems, remote instruction systems or audio-visual instruction systems have been developed to provide an organized communication mechanism for multiple-party or long-distance communications. Each of the systems usually includes a plurality of voice control apparatuses that is used to receive or broadcast the voice. Each of the voice control apparatus usually includes microphones, speakers and a central computer for communication purposes of the users.

As an example of a conference or instruction system, the voice is usually outputted only when the user speaks. In order to maintain the communication order and to provide the power-saving and noise-free functions, the conventional voice control apparatus usually includes a button in which the user can press the button to enable the broadcasting function when it is desired to speak (give a speech), and then press the button again to disable the broadcasting function after the speed is delivered. However, this requires manual control of the apparatus and thus is not convenient for use. In addition, it is often the case where the user forgot to disable the broadcasting function. Furthermore, it is also inconvenient to repeatedly press the button for enabling and disabling the broadcasting function.

In light of this, several conventional automatic voice control systems that do not require manual switching of the broadcasting function have been developed to overcome the deficiency of the conventional voice control apparatus. The automatic voice control systems can automatically detect whether there is any person around via infrared ray detection or ultrasonic detection, and accordingly enables or disables the broadcasting function. One example of such an automatic voice control system can be seen in China utility model Patent No. 202551276U. However, when the automatic voice control system is used in a conference or a lecture class, the user usually stays close enough to the voice control system in order to speak through the system in any time. As a result, the voice control system will enable its broadcasting function all the time, not just at the time when the user is about to speak. Therefore, the control of the broadcasting function does not fit to the practical use of the user, nor does it maintain the communication order and provide the power-saving and noise-free functions.

In light of this, it is necessary to improve the conventional voice control system.

SUMMARY OF THE INVENTION

It is therefore the object of the disclosure to provide a voice control system that can automatically control the broadcasting function according to the user's habitual behavior.

It is another object of the disclosure to provide a voice control method that can be executed by the voice control system to automatically control the broadcasting function according to the user's habitual behavior.

It is a further object of the disclosure to provide a computer program product that contains a program that can be loaded in a computer to automatically control the broadcasting function according to the user's habitual behavior.

It is still a further object of the disclosure to provide a computer readable medium that can store the computer program product. The computer program product contains the program that can be loaded in a computer to automatically control the broadcasting function according to the user's habitual behavior.

In an embodiment of the disclosure, a voice control system including a voice receiving unit, an image capturing unit, a storage unit and a control unit is disclosed. The voice receiving unit is configured to receive a voice. The image capturing unit is configured to capture a video image stream including a plurality of human face images that has been captured in a plurality of continuous time frames. The storage unit is configured to store the voice and the video image stream. The control unit is electrically connected to the voice receiving unit, the image capturing unit and the storage unit. The control unit is configured to detect a feature of a human face from the plurality of human face images of the video image stream, to define a mouth motion detection region from the feature of the human face, and to generate a control signal according to a variation of the mouth motion detection region between two adjacent human face images of the plurality of human face images and a variation of the voice over time.

In a form shown, the voice control system further includes a voice control unit electrically connected to the control unit.

In the form shown, the voice control system further includes a communication unit electrically connected to the control unit.

In the form shown, the voice control system further includes a first communication unit electrically connected to the control unit, a second communication unit coupled with the first communication unit, and a voice control unit electrically connected to the second communication unit.

In another form shown, the voice control method that can be executed by the voice control system is disclosed. The voice control method includes receiving a voice, capturing a video image stream including a plurality of human face images that has been captured in a plurality of continuous time frames, storing the voice and the video image stream, detecting a feature of a human face from the plurality of human face images of the video image stream, defining a mouth motion detection region from the feature of the human face; and generating a control signal according to a variation of the mouth motion detection region between two adjacent human face images of the plurality of human face images and a variation of the voice over time.

In the above, after the control signal is in an enabled state for a period of time, the control unit is able to determine whether the control signal should be continued according to the variation of the mouth motion detection region and the variation of the voice over time.

In the above, the control signal is in an enabled state only when the variation of the mouth motion detection region is larger than a first threshold value and the variation of the voice over time is larger than a second threshold value. Otherwise, the control signal is in a disabled state.

In the above, the first threshold value is a movement threshold value. As such, the mouth motion detection region includes a plurality of pixels. At least one of the plurality of pixels carries a characteristic that has a movement pattern. The control unit determines whether a quantity of the at least one of the plurality of pixels is larger than the movement threshold value, so as to determine whether the control signal should be generated.

In the above, each of the at least one of the plurality of pixels has a movement direction which is within a range of an angle centered at a longitudinal axis of a plane coordinate system. The angle is smaller than 90°.

In the above, the first threshold value is set as an area of the feature of the human face in a previous one of the plurality of human face images. In this regard, the control unit determines whether the feature of the human face in a current one of the plurality of human face images, which follows the previous one of the plurality of human face images, has an area that is several times larger than the first threshold value. The determined result is used to determine whether the control signal should be generated.

In the above, the voice has a waveform including a plurality of sections. Each of the plurality of sections has a magnitude. The control unit determines whether the magnitude of a current one of the plurality of sections is larger than the second threshold value.

In the above, the control unit detects the feature of the human face in every M images of the plurality of human face images based on a characteristic model algorithm, and detects the feature of the human face in remaining images of the plurality of human face images based on template match algorithm. M is an integer larger than 1.

In the above, the feature of the human face is a nose of the human face.

In the above, the mouth motion detection region is a rectangular region below the nose of the human face.

In the above, the rectangular region has an area that is larger than an area of the nose.

In a further embodiment of the disclosure, a computer program product that contains a program is disclosed. The program can be loaded in a computer to execute the above voice control method.

In still a further embodiment of the disclosure, a computer readable medium that contains a program is disclosed. The program can be loaded in a computer to execute the above voice control method.

In the voice control system, the voice control method, the computer program product, and the computer readable medium of the disclosure above, the broadcasting function can be controlled based on the user's motion and voice. Thus, the broadcasting function is automatically controlled based on the habitual behavior of the user without having to manually enable and disable the broadcasting function. As such, it does overcome the disadvantage of the prior art where the conventional voice control apparatus cannot fit to the habitual behavior of the user. At the same time, the power-saving and noise-free functions and the maintenance of the communication order as required in a conference or a lecture class are also provided.

BRIEF DESCRIPTION OF THE DRAWINGS

The present disclosure will become more fully understood from the detailed description given hereinafter and the accompanying drawings which are given by way of illustration only, and thus are not limitative of the present disclosure, and wherein.

Figure 1:
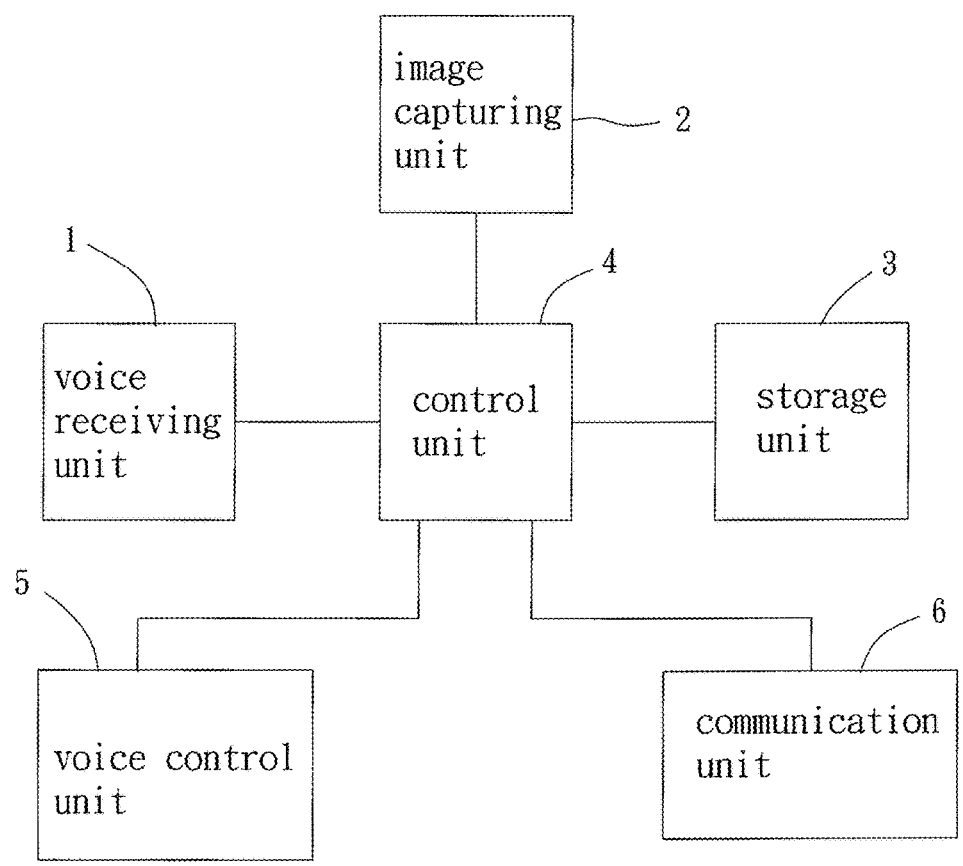
FIG. 1 shows a block diagram of a voice control system according to a first embodiment of the disclosure.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the disclosure.

DETAILED DESCRIPTION OF THE INVENTION

The term "couple" used hereinafter refers to a connection between two electronic devices which exchange information in a wired manner (through cables or fibers) or wireless manner (through infrared ray, Bluetooth, WiFi or 3G), as it can be readily appreciated by the persons having ordinary skill in the art.

The term "optical flow detection" used hereinafter refers to a method which, among a plurality of continuous images, detects the flow of light of a target object between two adjacent images. The image of the target object usually consists of a plurality of pixels, and the flow of light of each of the pixels can be expressed by a vector. Based on this, the flow of light of the target object can be expressed by a plurality of vectorsas indicated by the broken lines in FIGS. 5a and 5b. One example of the optical flow detection can be seen in the academic paper entitled "Two-Frame Motion Estimation Based on Polynomial Expansion" as published by Gunnar Farneback on Image Analysis—Lecture Notes in Computer Science Volume 2749, 363-370, 2003. The optical flow detection is also described in the documents entitled "Pyramidal Implementation of the Lucas Kanade Feature Tracker Description of the algorithm," "Determining Optical flow," "SimpleFlew: A Non-iterative, Sublinear Optical Flow Algorithm." In addition, the optical flow detection can be carried out by an optical flow algorithm implemented by Open Source Computer Vision Library (openCV), and its use can be readily appreciated by the persons having ordinary skill in the art.

FIG. 1 shows a block diagram of a voice control system according to a first embodiment of the disclosure. The voice control system may include a voice receiving unit 1, an image capturing unit 2, a storage unit 3 and a control unit 4. The voice receiving unit 1 may be a conventional voice receiving unit that is used to receive a voice, such as a microphone. The image capturing unit 2 may be a conventional image capturing unit that is used to capture a video image stream, such as a video camera. The video image stream may include a plurality of human face images that has been captured in a plurality of continuous time frames. The human face images may be obtained by the image capturing unit 2 capturing the face images of the user. The storage unit 3 may be a conventional data storage device, such as a memory unit, a hard drive or a database that is used to store the voice and the video image stream. The control unit 4 may be a device capable of performing data processing, such as a microprocessor, a micro control unit, a digital signal processor or an embedded system. The control unit 4 may be electrically connected to the voice receiving unit 1, the image capturing unit 2 and the storage unit 3, and can execute a broadcast program. The broadcast program is used to process the voice and the video image stream and may generate a control signal which controls the broadcasting function. In addition, the voice control system may further include a voice control unit 5 (such as a conventional speaker or earphone) and a communication unit 6 (such as a conventional wired or wireless transceiver). The voice control unit 5 and the communication unit 6 may electrically connect to the control unit 4 to provide the broadcasting and communication functions. As it will be described later, the voice control system of the first embodiment of the disclosure may have different implementations during the use thereof. However, this is not used to limit the scope of the disclosure.

Figure 2A:
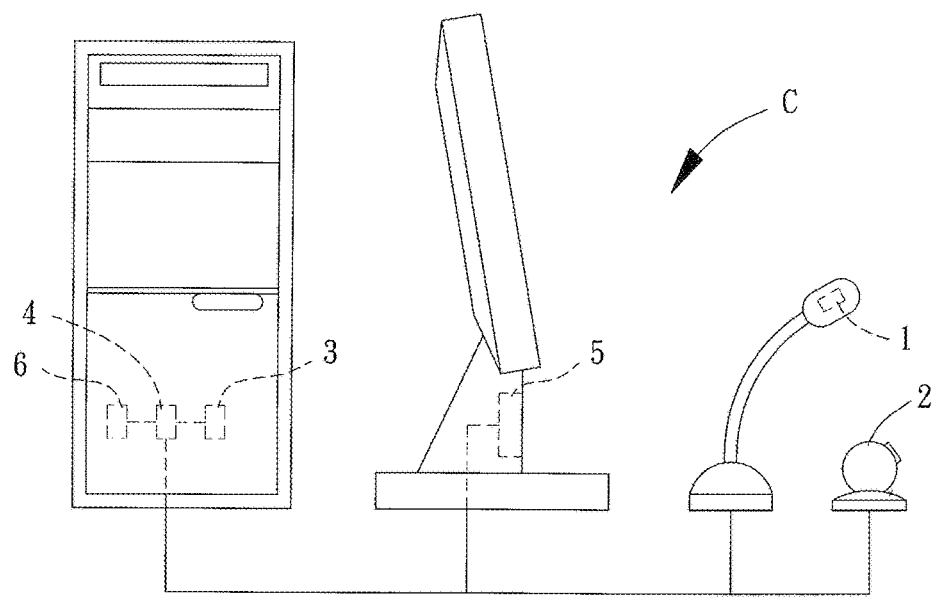
FIG. 2a shows a first implementation of the voice control system of the first embodiment of the disclosure.
Figure 2B:
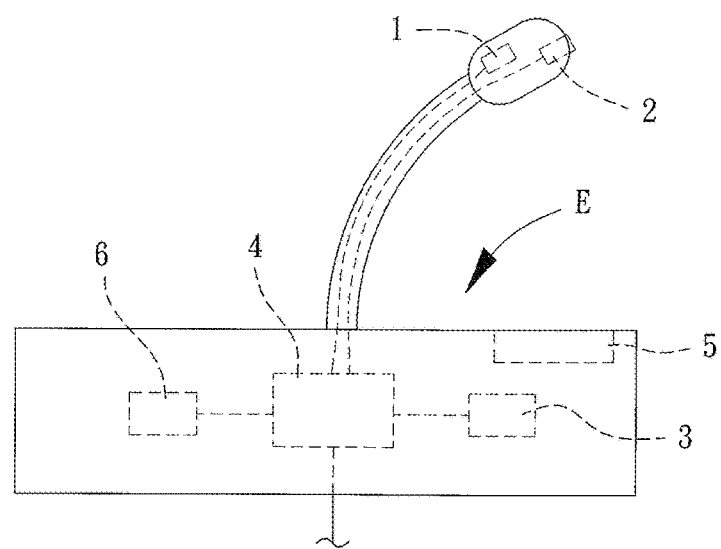
FIG. 2b shows a second implementation of the voice control system of the first embodiment of the disclosure.
Figure 2C:
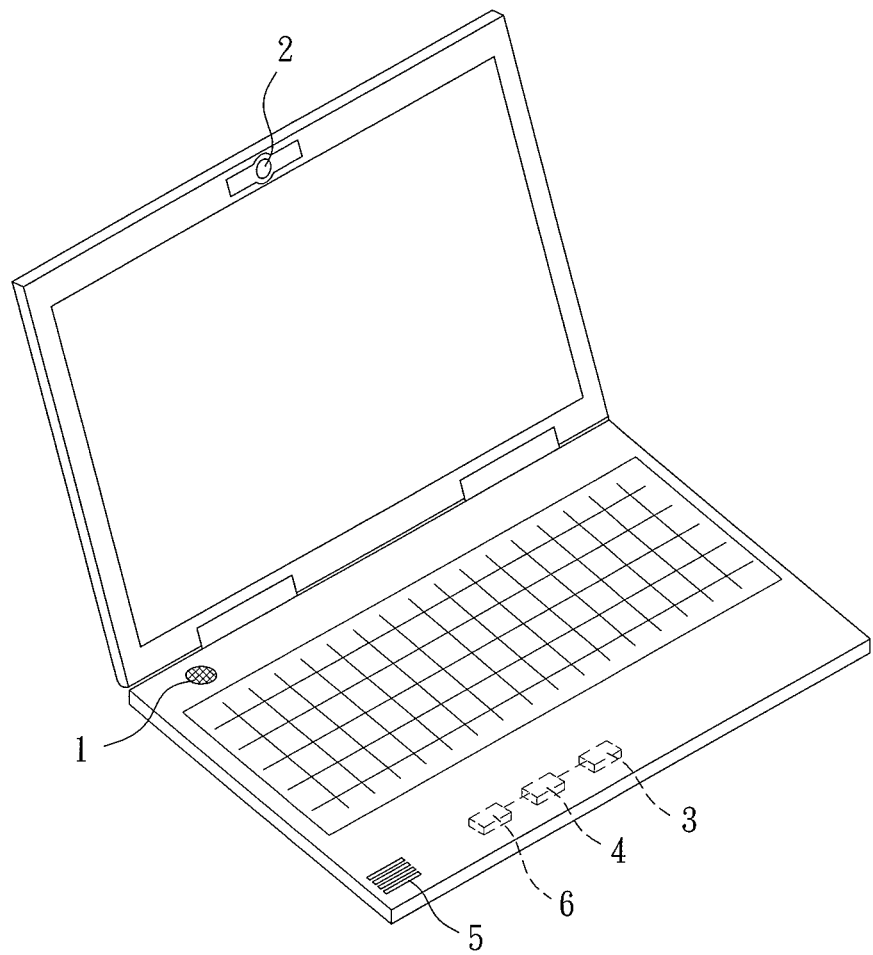
FIG. 2c shows a third implementation of the voice control system of the first embodiment of the disclosure.

For example, the voice control system of the first embodiment of the disclosure may be implemented as a computer system C as shown in FIG. 2a. In this implementation, the voice receiving unit 1 may be a microphone, and the image capturing unit 2 may be a web camera. In addition, the storage unit 3, the control unit 4 and the communication unit 6 may be integrated into a computer of the computer system C. Also, the voice control unit 5 may be a speaker embedded in a display of the computer system C. In this arrangement, the user can attend a remote instruction program or a conference through the internet. Alternatively, the voice receiving unit 1, the image capturing unit 2, the storage unit 3, the control unit 4, the voice control unit 5 and the communication unit 6 may be integrated as a speaking machine E as shown in FIG. 2b. In this implementation, the storage unit 3, the control unit 4, the voice control unit 5 and the communication unit 6 may be disposed in a base of the speaking machine E. However, the voice receiving unit 1 and the image capturing unit 2 may also be disposed in the base. The arrangement of the above elements 1-6 can be readily appreciated by the skilled persons. The speaking machine E may also be coupled to a central controller (not shown). In this regard, the central controller may be coupled with at least one speaking machine E to form a conferencing or instruction system. In another implementation shown in FIG. 3, the voice receiving unit 1, the image capturing unit 2, the storage unit 3, the control unit 4, the voice control unit 5 and the communication unit 6 may be integrated in a portable electronic device P such as a notebook computer, a tablet or a smart phone. As such, the user is able to communicate with others in any place and any time. However, this arrangement is not used to limit the scope of the disclosure. Besides, the voice control unit 5 and the voice receiving unit 1 may be located in different places to form another embodiment of the disclosure, as described below.

Figure 3:
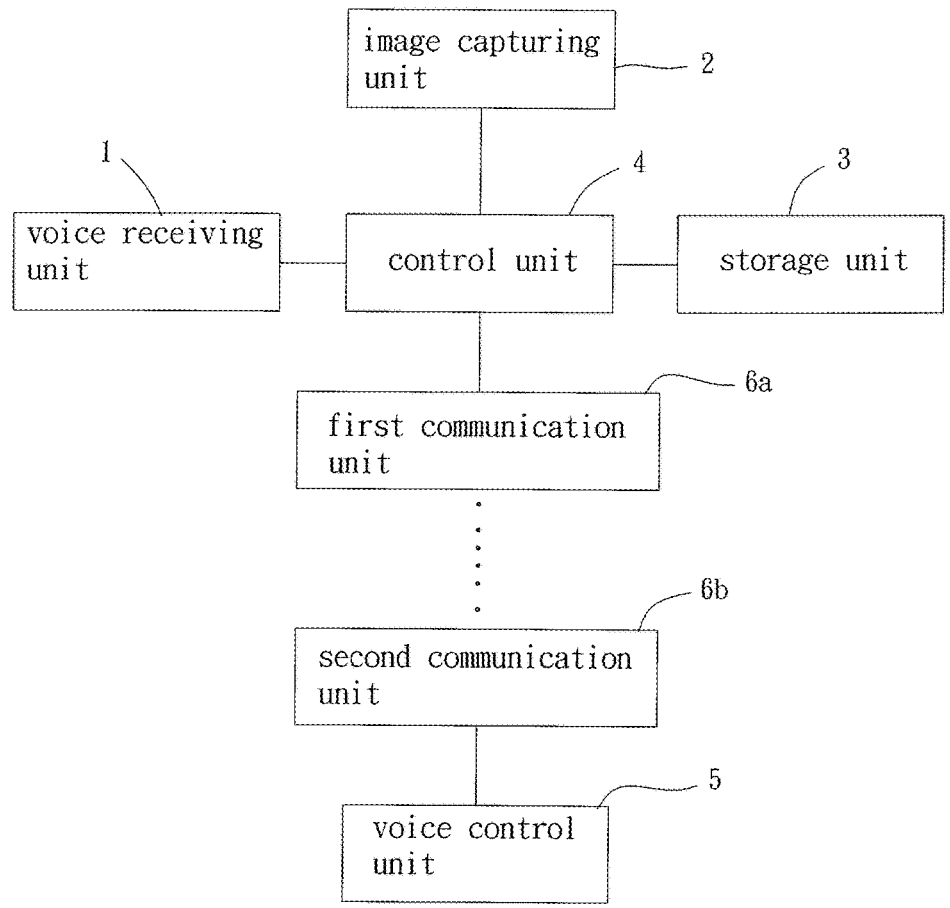
FIG. 3 shows a block diagram of a voice control system according to a second embodiment of the disclosure.

FIG. 3 shows a block diagram of a voice control system according to a second embodiment of the disclosure. In addition to the voice receiving unit 1, the image capturing unit 2, the storage unit 3, the control unit 4, the voice control unit 5 and the communication unit 6, the voice control system in the second embodiment may further include a first communication unit 6a and a second communication unit 6b (such as a conventional transceiver used in wired or wireless communication). The control unit 4 is electrically connected to the voice receiving unit 1, the image capturing unit 2, the storage unit 3 and the first communication unit 6a. The first communication unit 6a is coupled to the second communication unit 6b, and the second communication unit 6b is electrically connected to the voice control unit 5. The voice control unit 5 and the voice receiving unit 1 may be located at different places for remote broadcasting purposes. The operation of the voice control system of the second embodiment of the disclosure is described below.

During the operation of the voice control system of the second embodiment of the disclosure, the control unit 4 may detect a feature of a human face. The feature of the human face may be the nose of the human face. With the nose being the feature, it will be more convenient to search the region of the mouth of the human face. Based on the searched mouth region, it is possible to determine whether the user is speaking by detecting the motion of the mouth. Next, a mouth motion detection region may be defined from the human face. In this regard, a rectangular region below the nose may be defined as the mouth motion detection region. The rectangular region may have an area which is several times larger than the area of the nose region (such as K times larger, K=2, for example), so as to detect whether the mouth region in adjacent images reflects an open-and-close motion indicative of a mouth talking movement. Then, the control signal may be generated according to the image variation of the mouth motion detection region between the adjacent images, as well as the variation of the voice over time. The image variation of the mouth motion detection region may be determined by factors such as motion vectors, the increase or reduction in the area of the mouth region, and/or the color difference between the pixels. In addition, the variation of the voice over time may be determined by the magnitude difference.

In the above embodiments, when the control signal is enabled for a predetermined period of time (such as 5 seconds), the control unit 4 can determine whether it should continue to enable the control signal according to the image variation of the mouth motion detection region and the variation of the voice over time. In this mechanism, it can be determined whether the broadcasting operation of the voice should be continued. If the image variation of the mouth motion detection region between the adjacent images is larger than a first threshold value (which means the mouth image exhibits a possible talking movement of the user) and if the variation of the voice over time is larger than a second threshold value (which means the mouth is probably producing voice), the control signal is set as an enabled state (such as logic high "1", but is not limited thereto). In this situation, the broadcasting function is enabled and the user's voice is sent to the voice control unit 5 for broadcasting purposes. In another case where either or both of the conditions are not met, the control signal is set as a disabled state (such as logic low "0", but is not limited thereto). In this situation, the broadcasting function is disabled in order not to broadcast the unnecessary noise when the user is not speaking. The detection of the image variation of the mouth motion detection region is described below, but it is not used to limit the scope of the disclosure.

In the detection, the image variation of the mouth motion detection region may be determined by the motion vectors and/or the variation of the mouth region. For example, the optical flow detection mechanism may be used to determine the motion vectors of a target object in adjacent images. Each of the motion vectors can be converted into an angle on a plane coordinate system. The calculation thereof can be expressed in an equation below:

$$A_g = \begin{cases} \dfrac{A\tan2(F_y, F_x)}{\pi} \cdot 180, & F_y \geq 0 \\ \dfrac{A\tan2(F_y, F_x)}{\pi} \cdot 180 + 360, & F_y < 0 \end{cases} \quad (1)$$

Figure 5A:
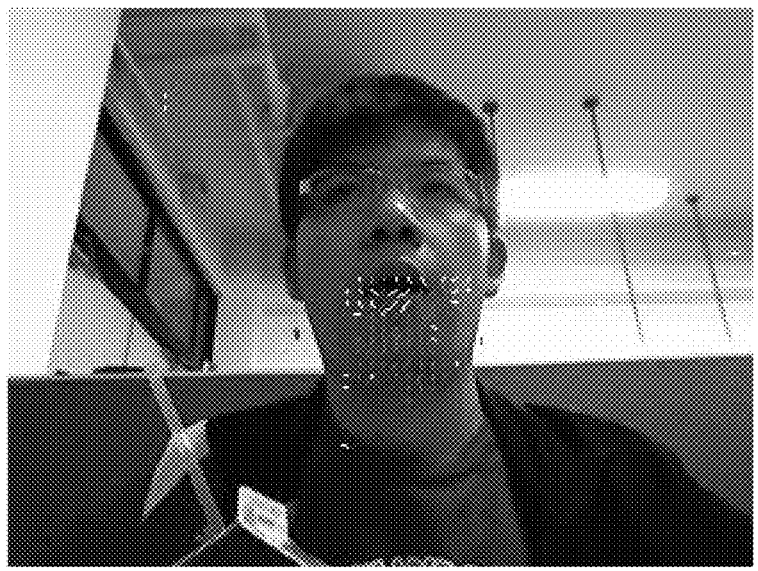
FIG. 5a shows an image of the flow of light when the user opens the mouth.
Figure 5B:
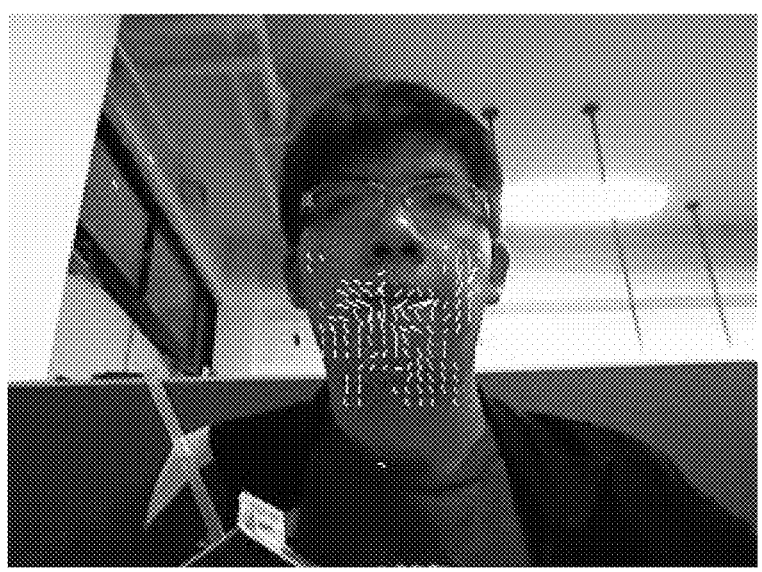
FIG. 5b shows an image of the flow of light when the user closes the mouth.

In the above, $A_g$ is the angle on the plane coordinate system, $F_X$ is the variation of movement of the motion vector along an X axis, and $F_Y$ is the variation of movement of the motion vector along a Y axis. It is noted that each of the pixels in the mouth motion detection region carries a characteristic (such as color) that may move among various images. Therefore, for each of the pixels in the mouth motion detection region whose characteristic has a movement pattern, the characteristic of the pixel has a movement direction. For example, if a pixel in the mouth motion detection region is a red spot (which carries a characteristic of red color), the red spot may move from a coordinate (x, y) in the current image to another coordinate (x+x1, y+y1) in the next image (both x1 and y1 are an integer). In this case, the characteristic (red color) of the pixel is defined as having a movement pattern. The movement direction is within the range of an angle centered at a longitudinal axis of the plane coordinate system (x, y), such as a Y axis of the coordinate system (x, y). The range of the angle may be smaller than 90°. For example, given that the X axis has 0°, the range of the angle may be 90°±44.5° or 270°±44.5°. As such, it can be detected whether the mandible in the human face image has an open-and-close motion indicative of a mouth talking movement. In this situation, the first threshold value may be a movement threshold value. In this regard, for those pixels in the mouth motion detection region whose characteristics have a movement pattern, the control unit 4 can determine whether the quantity of the pixels is larger than the movement threshold value (such as 200). Thus, the control unit 4 can determine whether the control signal should be generated. For example, FIG. 5a shows the image of the flow of light when the user opens the mouth, and FIG. 5b shows the image of the flow of light when the user closes the mouth. The thin, broken lines in the mouth region in FIGS. 5a and 5b represent the flow directions of the light. In FIG. 5a, the quantity of the pixels whose movement angle is within 60° to 120° (which reflects an upward movement of the mandible) is 911. In FIG. 5b, the quantity of the pixels whose movement angle is within 240° to 300° (which reflects a downward movement of the mandible) is 828.

Moreover, when the user is going to speak through the voice control unit 5 for broadcasting purpose, the user tends to approach his/her mouth to the voice receiving unit 1 and the image capturing unit 2 and starts to move his/her mouth for speaking. Therefore, the control signal can be generated when it is detected that the user approaches his/her mouth to the image capturing unit 2. In this mechanism, it can be detected whether the area of the nose or mouth of the user in the video image stream, as captured by the image capturing unit 2, becomes larger and larger. Since the region of the feature of the human face has a certain area in an image, the control unit 4 can set the first threshold value as the area of the region of the feature of the human face in a previous image. Based on this, the control unit 4 can determine whether the feature of the human face in the current image has an area that is several times larger than the first threshold value (such as 1.5 times). If the region of the feature of the human face has 34*12=782 pixels in the previous image and has 47*29=1363 pixels (which is larger than 782*1.5) in the current image, it can be determined that the user is approaching his/her mouth to the image capturing unit. Accordingly, the control signal is generated. In the following, the detection of the variation of the voice over time is described, but this is not used to limit the scope of the disclosure.

First, it is understood that the voice has a waveform that can be divided into a plurality of sections (such as ½0 sec). Each section has a maximum positive peak value and a maximum negative peak value. The difference between the maximum positive peak value and the maximum negative peak value is defined as the magnitude of the section. Based on this, the control unit 4 is able to determine whether the magnitude of the voice is larger than the second threshold value. The result can be used to determine whether the user has started to speak (the user's voice becomes loud suddenly, which leads to a sudden rise in the magnitude of the voice). However, this is not used to limit the scope of the disclosure.

In an alternative, the plurality of sections of the waveform of the voice may include a first section and a second section immediately following the first section. Namely, the first and second sections are immediately adjacent to each other among the plurality of sections of the waveform of the voice. In this regard, the control unit 4 is able to determine whether the magnitude of the second section is larger than the magnitude of the first section by the second threshold value. The result also can be used to determine whether the user has started to speak (the user's voice becomes loud than before, which leads to a sudden rise in the magnitude of the voice). However, this is not used to limit the scope of the disclosure.

Furthermore, before the control unit 4 performs the above steps, the control unit 4 may perform a pre-processing step. The pre-processing step may include enlarging or reducing the size of the image, or transforming a color image into a grey-scale image. Next, based on a characteristic model algorithm, the control unit 4 may detect the feature of the human face in every few images (such as in every M images, M=5, for example). In other images, the feature of the human face may be detected using template match algorithm to reduce the time in locating the feature of the human face, as well as to reduce the complexity of the algorithm. The characteristic model algorithm may be the algorithms that use Haar rectangular characteristic model, such as Adaboost algorithm, LBP algorithm, Eigenfaces algorithm, Fisherfaces algorithm, or OpenCV library that has the similar function. The template match algorithm may be referred to the book entitled "Template Matching Techniques in Computer Vision: Theory and Practice" as published by Roberto Brunelli in 2009. The image processing procedures thereof can be readily appreciated by the persons having ordinary skill in the art.

Figure 4:
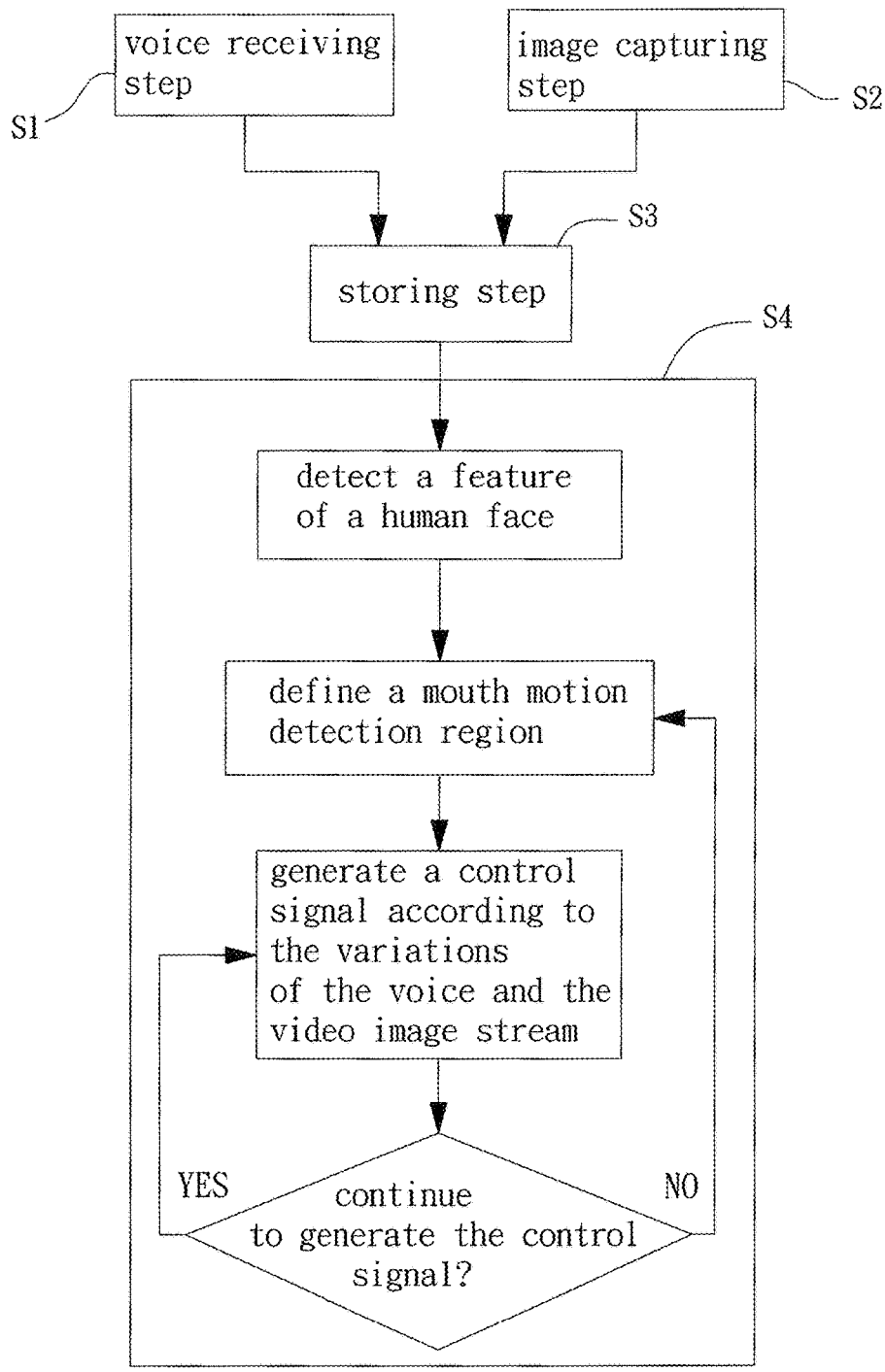
FIG. 4 shows a flowchart of a voice control method according to an embodiment of the disclosure.

FIG. 4 shows a flowchart of a voice control method according to an embodiment of the disclosure. The voice control method may be performed by the voice control system as described above, and may include a voice receiving step S1, an image capturing step S2, a storing step S3 and a control step S4. The voice receiving step S1 may be adapted to receive a voice. The image capturing step S2 may be adapted to capture a video image stream that can include a plurality of human face images that has been captured in a plurality of continuous time frames. The storing step S3 may be adapted to store the voice and the video image stream. The control step S4 may be adapted to detect a feature of a human face from the plurality of human face images of the video image stream, to define a mouth motion detection region from the feature of the human face, and to generate a control signal according to the variation of each pixel of the mouth motion detection region and the variation of the voice over time.

In the embodiment of the voice control method, when the control signal is enabled for a predetermined period of time, it can be determined again whether it should continue to enable the control signal according to the image variation of the mouth motion detection region and the variation of the voice over time. If the image variation of the mouth motion detection region is larger than the first threshold value and the variation of the voice over time is larger than the second threshold value, the control signal may be generated. Otherwise, the control signal is not generated. In this regard, the first threshold value may be the movement threshold value in order to determine whether the quantity of the pixels, whose characteristics appear to have a movement pattern, is larger than the movement threshold value. The determined result can be used to decide whether the control signal should be generated. For each of the pixels in the mouth motion detection region whose characteristic has a movement pattern, the characteristic of the pixel has a movement direction. The movement direction is within the range of an angle centered at a longitudinal axis of the plane coordinate system, and the range of the angle may be smaller than 90°. In another aspect, the first threshold value may be set as the area of the region of the feature of the human face in a previous image. Based on this, it can be determined whether the region of the feature of the human face in the current image has an area that is larger than the first threshold value. The determined result can be used to decide whether the control signal should be generated. In addition, the second threshold value may be set as N in order to determine whether the absolute value of the second peak value of the latter peak is N times larger than the absolute value of the first peak value of the former peak. In addition, the feature of the human face can be detected in every few images (such as in every M images, M=5, for example) according to the characteristic model algorithm. In the remaining images other than the every few images, the feature of the human face may be detected using template match algorithm. The feature of the human face may be the nose of the human face, and a rectangular region below the nose may be defined as the mouth motion detection region. The rectangular region may have an area which is several times larger than the area of the nose. The details have been described above and therefore are not discussed herein again.

Besides, the voice control method of the disclosure may be programmed into a computer program (such as the broadcast program mentioned above) using a programming language such as C++ or Java. The programming of the broadcast program can be readily appreciated by the persons having ordinary skill in the art. As such, a computer program product capable of executing the voice control method can be produced. When the computer program is loaded and executed by a computer, the voice control method of the disclosure may be performed to operate the voice control system of the disclosure.

Furthermore, the computer program may be stored in a computer readable medium such as a memory device, a memory card, a hard drive, a compact disc, a USB disc, etc. As such, when the computer program is loaded and executed by a computer, the voice control method of the disclosure may be performed to operate the voice control system of the disclosure.

Based on the above description, the voice control system, the voice control method, the computer program product and the computer readable medium are characterized as follows. Specifically, the voice control system includes the voice receiving unit, the image capturing unit, the storage unit and the control unit. The voice receiving unit may be used to receive the voice, and the image capturing unit may be used to capture the video image stream. The video image stream may include a plurality of human face images. The storage unit may be used to store the voice and the video image stream. The control unit may be electrically connected to the voice receiving unit, the image capturing unit and the storage unit. As such, the control unit may detect a feature of a human face from the plurality of human face images of the video image stream, define a mouth motion detection region from the feature of the human face, and generate a control signal according to the variation of each pixel of the mouth motion detection region and the variation of the voice over time.

Based on this, in the voice control system, the voice control method, the computer program product and the computer readable medium of the disclosure, the control of the broadcasting function may be based on the user's motion and voice. Thus, the broadcasting function can be automatically enabled based on the user's habitual behavior without having to manually enable or disable the broadcasting function. Thus, the disclosure not only can overcome the disadvantage of the prior art where the conventional voice control apparatus cannot fit to the habitual behavior of the user, but also can maintain the communication order and provide the power-saving and noise-free functions.

Although the disclosure has been described in detail with reference to its presently preferable embodiments, it will be understood by one of ordinary skill in the art that various modifications can be made without departing from the spirit and the scope of the disclosure, as set forth in the appended claims.

What is claimed is:

1. A voice control system comprising:
   a voice receiving unit configured to receive a voice;
   an image capturing unit configured to capture a video image stream, wherein the video image stream comprises a plurality of human face images that has been captured in a plurality of continuous time frames;
   a storage unit configured to store the voice and the video image stream; and
   a control unit electrically connected to the voice receiving unit, the image capturing unit and the storage unit, wherein the control unit is configured to detect a feature of a human face from the plurality of human face images of the video image stream, to define a mouth motion detection region from the feature of the human face, and to generate a control signal according to a variation of the mouth motion detection region between two adjacent human face images of the plurality of human face images and a variation of the voice over time, wherein the control unit detects the feature of the human face in every M images of the plurality of human face images based on a characteristic model algorithm, and detects the feature of the human face in remaining images of the plurality of human face images based on a template match algorithm, and wherein M is an integer larger than 1.

2. The voice control system as claimed in claim 1, wherein the control unit, after the control signal is in an enabled state for a period of time, determines whether the control signal should be continued according to the variation of the mouth motion detection region and the variation of the voice over time.

3. The voice control system as claimed in claim 1, wherein the control signal is in an enabled state only when the variation of the mouth motion detection region is larger than a first threshold value and the variation of the voice over time is larger than a second threshold value, otherwise, the control signal is in a disabled state.

4. The voice control system as claimed in claim 3, wherein the first threshold value is a movement threshold value, wherein the mouth motion detection region comprises a plurality of pixels, wherein at least one of the plurality of pixels carries a characteristic that has a movement pattern, and wherein the control unit determines whether a quantity of the at least one of the plurality of pixels is larger than the movement threshold value, so as to determine whether the control signal should be generated.

5. The voice control system as claimed in claim 3, wherein the voice has a waveform comprising a plurality of sections, wherein each of the plurality of sections has a magnitude, and wherein the control unit is configured to determine whether the magnitude of a current one of the plurality of sections is larger than the second threshold value.

6. The voice control system as claimed in claim 1, wherein the feature of the human face is a nose of the human face.

7. The voice control system as claimed in claim 6, wherein the mouth motion detection region is a rectangular region below the nose of the human face.

8. The voice control system as claimed in claim 7, wherein the rectangular region has an area that is larger than an area of the nose.

9. The voice control system as claimed in claim 1, further comprising a voice control unit electrically connected to the control unit.

10. The voice control system as claimed in claim 1, further comprising a communication unit electrically connected to the control unit.

11. The voice control system as claimed in claim 1, further comprising a first communication unit electrically connected to the control unit, a second communication unit coupled with the first communication unit, and a voice control unit electrically connected to the second communication unit.

12. A voice control system comprising:
a voice receiving unit configured to receive a voice;
an image capturing unit configured to capture a video image stream, wherein the video image stream comprises a plurality of human face images that has been captured in a plurality of continuous time frames;
a storage unit configured to store the voice and the video image stream; and
a control unit electrically connected to the voice receiving unit, the image capturing unit and the storage unit, wherein the control unit is configured to detect a feature of a human face from the plurality of human face images of the video image stream, to define a mouth motion detection region from the feature of the human face, and to generate a control signal according to a variation of the mouth motion detection region between two adjacent human face images of the plurality of human face images and a variation of the voice over time,
wherein the control signal is in an enabled state only when the variation of the mouth motion detection region is larger than a first threshold value and the variation of the voice over time is larger than a second threshold value, otherwise, the control signal is in a disabled state,
wherein the first threshold value is a movement threshold value, wherein the mouth motion detection region comprises a plurality of pixels, wherein at least one of the plurality of pixels carries a characteristic that has a movement pattern, and wherein the control unit determines whether a quantity of the at least one of the plurality of pixels is larger than the movement threshold value to determine whether the control signal should be generated,
wherein each of the at least one of the plurality of pixels has a movement direction, wherein the movement direction is within a range of an angle centered at a longitudinal axis of a plane coordinate system, and wherein the angle is smaller than 90°.

13. A voice control system comprising:
a voice receiving unit configured to receive a voice;
an image capturing unit configured to capture a video image stream, wherein the video image stream comprises a plurality of human face images that has been captured in a plurality of continuous time frames;
a storage unit configured to store the voice and the video image stream; and
a control unit electrically connected to the voice receiving unit, the image capturing unit and the storage unit, wherein the control unit is configured to detect a feature of a human face from the plurality of human face images of the video image stream, to define a mouth motion detection region from the feature of the human face, and to generate a control signal according to a variation of the mouth motion detection region between two adjacent human face images of the plurality of human face images and a variation of the voice over time,
wherein the control signal is in an enabled state only when the variation of the mouth motion detection region is larger than a first threshold value and the variation of the voice over time is larger than a second threshold value, otherwise, the control signal is in a disabled state,
wherein the first threshold value is set as an area of the feature of the human face in a previous one of the plurality of human face images, wherein the control unit determines whether the feature of the human face in a current one of the plurality of human face images, which follows the previous one of the plurality of human face images, has an area that is two times larger than the first threshold value, and wherein the determined result is used to determine whether the control signal should be generated.

14. A voice control method as performed by a voice control system, comprising:
receiving a voice by a voice receiving unit of the voice control system;

receiving a video image stream, which comprises a plurality of human face images that has been captured in a plurality of continuous time frames, by an image capturing unit of the voice control system;

storing the voice and the video image stream by a storage unit of the voice control system;

detecting a feature of a human face in every M images of the plurality of human face images based on a characteristic model algorithm, as performed by a control unit of the voice control system, wherein M is an integer larger than 1;

detecting the feature of the human face in remaining images of the plurality of human face images based on a template match algorithm, as performed by the control unit of the voice control system;

defining a mouth motion detection region from the feature of the human face by the control unit of the voice control system; and generating a control signal according to a variation of the mouth motion detection region between two adjacent human face images of the plurality of human face images and a variation of the voice over time, as performed by the control unit of the voice control system.

15. The voice control method as claimed in claim 14, wherein generating the control signal comprises:

determining whether the control signal should be continued according to the variation of the mouth motion detection region and the variation of the voice over time after the control signal is in an enabled state for a period of time.

16. The voice control method as claimed in claim 14, wherein the control signal is in an enabled state only when the variation of the mouth motion detection region is larger than a first threshold value and the variation of the voice over time is larger than a second threshold value, otherwise, the control signal is in a disabled state.

17. The voice control method as claimed in claim 16, wherein the first threshold value is a movement threshold value, wherein the mouth motion detection region comprises a plurality of pixels, wherein at least one of the plurality of pixels carries a characteristic that has a movement pattern, and wherein generating the control signal comprises:

determining whether a quantity of the at least one of the plurality of pixels is larger than the movement threshold value to determine whether the control signal should be generated.

18. The voice control method as claimed in claim 16, wherein the voice has a waveform comprising a plurality of sections, wherein each of the plurality of sections has a magnitude, and wherein generating the control signal comprises:

determining whether the magnitude of a current one of the plurality of sections of the voice is larger than the second threshold value.

19. The voice control method as claimed in claim 14, wherein the feature of the human face is a nose of the human face.

20. The voice control method as claimed in claim 19, wherein the mouth motion detection region is a rectangular region below the nose of the human face.

21. The voice control method as claimed in claim 20, wherein the rectangular region has an area that is larger than an area of the nose.

22. A non-transitory computer readable medium that contains a program that can be loaded in a computer to execute the voice control method as claimed in claim 14.

23. A voice control method as performed by a voice control system, comprising:

receiving a voice by a voice receiving unit of the voice control system;

receiving a video image stream, which comprises a plurality of human face images that has been captured in a plurality of continuous time frames, by an image capturing unit of the voice control system;

storing the voice and the video image stream by a storage unit of the voice control system;

detecting a feature of a human face from the plurality of human face images of the video image stream by a control unit of the voice control system;

defining a mouth motion detection region from the feature of the human face by the control unit of the voice control system;

generating a control signal according to a variation of the mouth motion detection region between two adjacent human face images of the plurality of human face images and a variation of the voice over time, as performed by the control unit of the voice control system, wherein the control signal is in an enabled state only when the variation of the mouth motion detection region is larger than a first threshold value and the variation of the voice over time is larger than a second threshold value, otherwise, the control signal is in a disabled state, wherein the first threshold value is a movement threshold value, wherein the mouth motion detection region comprises a plurality of pixels, wherein at least one of the plurality of pixels carries a characteristic that has a movement pattern, wherein each of the at least one of the plurality of pixels has a movement direction, and wherein the movement direction is within a range of an angle centered at a longitudinal axis of a plane coordinate system, and wherein the angle is smaller than 90°; and determining whether a quantity of the at least one of the plurality of pixels is larger than the movement threshold value to determine whether the control signal should be generated, as performed by the control unit of the voice control system.

24. A non-transitory computer readable medium that contains a program that can be loaded in a computer to execute the voice control method as claimed in claim 23.

25. A voice control method as performed by a voice control system, comprising:

receiving a voice by a voice receiving unit of the voice control system;

receiving a video image stream, which comprises a plurality of human face images that has been captured in a plurality of continuous time frames, by an image capturing unit of the voice control system;

storing the voice and the video image stream by a storage unit of the voice control system;

detecting a feature of a human face from the plurality of human face images of the video image stream by a control unit of the voice control system;

defining a mouth motion detection region from the feature of the human face by the control unit of the voice control system; and generating a control signal according to a variation of the mouth motion detection region between two adjacent human face images of the plurality of human face images and a variation of the voice over time, as performed by the control unit of the voice control system, wherein the control signal is in an enabled state only when the variation of the mouth motion detection region is larger than a first threshold value and the variation of the voice over time is larger than a second threshold value, otherwise, the control signal is in a disabled state, wherein the first threshold value is set as an area of the feature of the human face in a previous one of the plurality of human face images, wherein generating the control signal comprises:

determining whether the feature of the human face in a current one of the plurality of human face images, which follows the previous one of the plurality of human face images, has an area that is two times larger than the first threshold value, as performed by the control unit of the voice control system, and wherein the determined result is used to determine whether the control signal should be generated.

26. A non-transitory computer readable medium that contains a program that can be loaded in a computer to execute the voice control method as claimed in claim 25.

\* \* \* \* \*